(12) United States Patent
Tsukagoshi et al.

(10) Patent No.: US 11,887,382 B2
(45) Date of Patent: Jan. 30, 2024

(54) LANE-LINE RECOGNIZING APPARATUS FOR VEHICLE

(71) Applicant: SUBARU CORPORATION, Tokyo (JP)

(72) Inventors: Hajime Tsukagoshi, Tokyo (JP); Ryo Hajika, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 175 days.

(21) Appl. No.: 17/491,690

(22) Filed: Oct. 1, 2021

(65) Prior Publication Data

US 2022/0108118 A1 Apr. 7, 2022

(30) Foreign Application Priority Data

Oct. 2, 2020 (JP) ................................. 2020-168086

(51) Int. Cl.
*G06T 7/10* (2017.01)
*G06V 10/44* (2022.01)
*G06V 20/56* (2022.01)

(52) U.S. Cl.
CPC .............. *G06V 20/588* (2022.01); *G06T 7/10* (2017.01); *G06V 10/44* (2022.01); *G06T 2207/30256* (2013.01)

(58) Field of Classification Search
None
See application file for complete search history.

(56) References Cited

U.S. PATENT DOCUMENTS

| 7,876,926 | B2* | 1/2011 | Schwartz | G06V 20/588 |
| | | | | 701/1 |
| 2010/0002911 | A1* | 1/2010 | Wu | B60W 30/12 |
| | | | | 382/104 |
| 2011/0052079 | A1* | 3/2011 | Tamura | G06V 20/588 |
| | | | | 382/199 |
| 2012/0057757 | A1* | 3/2012 | Oyama | G06V 20/588 |
| | | | | 382/104 |

FOREIGN PATENT DOCUMENTS

JP 2019-79470 A 5/2019

\* cited by examiner

*Primary Examiner* — Idowu O Osifade
(74) *Attorney, Agent, or Firm* — TROUTMAN PEPPER HAMILTON SANDERS LLP

(57) ABSTRACT

A lane-line recognizing apparatus for a vehicle includes an edge-point detector and an approximate-line calculation processor. The edge-point detector is configured to detect edge points on the basis of brightness variation within a detection region for a lane line. The approximate-line calculation processor is configured to calculate an approximate line of a point group including the edge points. The lane-line recognizing apparatus has: a first mode in which the lane-line recognizing apparatus is configured to mainly search for standard edge candidate points having brightness relatively high; and a second mode in which the lane-line recognizing apparatus is configured to mainly search for opposite edge candidate points having brightness relatively low. The lane-line recognizing apparatus is configured to selectively perform switching between the first and the second modes in accordance with the number of the detected opposite edge candidate points.

3 Claims, 12 Drawing Sheets ically illustr# LANE-LINE RECOGNIZING APPARATUS FOR VEHICLE

CROSS-REFERENCE TO RELATED APPLICATION

The present application claims priority from Japanese Patent Application No. 2020-168086 filed on Oct. 2, 2020, the entire contents of which are hereby incorporated by reference.

BACKGROUND

The technology relates to a lane-line recognizing apparatus for vehicle that recognizes a lane line on the basis of an image captured by an on-vehicle camera.

Recently, various drive-assist apparatuses assisting a driving operation of a driver have been developed. In order to achieve a function such as a lane departure prevention function, such a drive-assist apparatus generally recognizes a lane line between traveling lanes on the basis of an image such as an image capturing a front region of an own vehicle, and estimates the traveling lanes on the basis of the recognized lane line.

Regarding such a lane-line recognition technique, for example, Japanese Unexamined Patent Application Publication No. 2019-79470 discloses a lane-line recognizing apparatus for vehicle that eliminates an influence of an image of light projected on a road surface to perform appropriate lane-line recognition. Such an existing lane-line recognizing apparatus for vehicle detects an edge point where brightness varies in a predetermined manner on a search line. The lane-line recognizing apparatus extracts an edge point where brightness varies from dark to bright, as a start point of a white line serving as a lane line. The lane-line recognizing apparatus extracts an edge point where brightness varies from bright to dark, as an end point of such a white line. The lane-line recognizing apparatus thus performs lane-line recognition.

SUMMARY

An aspect of the technology provides a lane-line recognizing apparatus for a vehicle. The lane-line recognizing apparatus includes an edge-point detector and an approximate-line calculation processor. The edge-point detector is configured to detect edge points on the basis of brightness variation in a horizontal direction within a detection region for a lane line. The detection region is set in an image obtained by imaging of a traveling environment of the vehicle. The approximate-line calculation processor is configured to calculate an approximate line of a point group including the edge points, and recognize the approximate line of the point group as an approximate line representing the lane line. The lane-line recognizing apparatus has a first mode and a second mode. The first mode is a mode in which the lane-line recognizing apparatus is configured to mainly search for standard edge candidate points. Each of the standard edge candidate points is one of the edge points having brightness that is relatively high with respect to brightness of a road surface on which the vehicle is traveling. The second mode is a mode in which the lane-line recognizing apparatus is configured to mainly search for opposite edge candidate points. Each of the opposite edge candidate points is one of the edge points having brightness that is relatively low with respect to the brightness of the road surface. The lane-line recognizing apparatus is configured to selectively perform switching between the first mode and the second mode in accordance with a number of the detected opposite edge candidate points.

An aspect of the technology provides a lane-line recognizing apparatus for a vehicle. The lane-line recognizing apparatus includes circuitry. The circuitry is configured to detect edge points on the basis of brightness variation in a horizontal direction within a detection region for a lane line. The detection region is set in an image obtained by imaging of a traveling environment of the vehicle. The circuitry is configured to calculate an approximate line of a point group including the edge point, and recognize the approximate line of the point group as an approximate line representing the lane line. The lane-line recognizing apparatus has a first mode and a second mode. The first mode is a mode in which the lane-line recognizing apparatus is configured to mainly search for standard edge candidate points. Each of the standard edge candidate point is one of the edge points having brightness that is relatively high with respect to brightness of a road surface on which the vehicle is traveling. The second mode is a mode in which the lane-line recognizing apparatus is configured to mainly search for opposite edge candidate points. Each of the opposite edge candidate point is one of the edge points having brightness that is relatively low with respect to the brightness of the road surface. The lane-line recognizing apparatus is configured to selectively perform switching between the first mode and the second mode in accordance with a number of the detected opposite edge candidate points.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
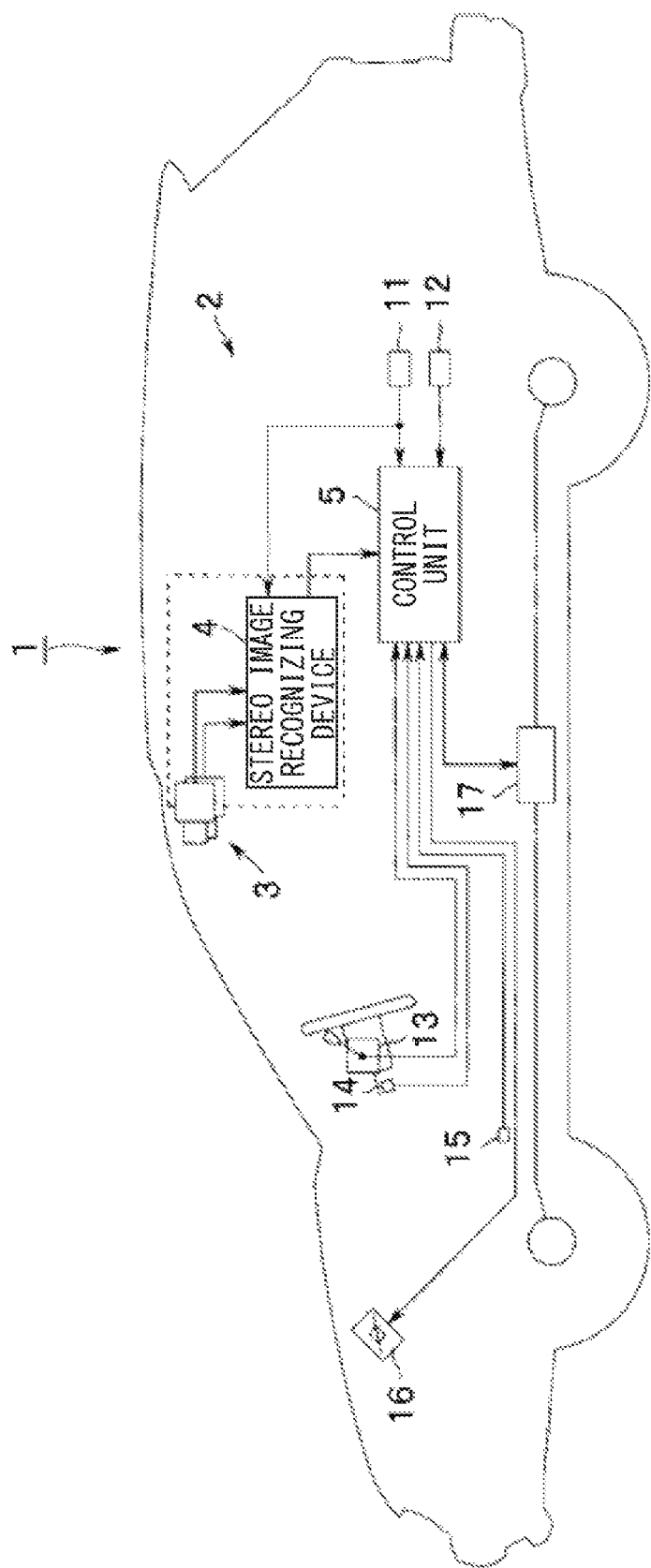
FIG. 1 is a schematic diagram illustrating an example of a configuration of a drive-assist apparatus for vehicle.

In countries other than Japan, a variety of colors of lane lines are used. For example, in the United States, there is a lane line in which a black line is provided between white broken lines extending in a traveling direction.

However, an existing lane-line recognition technique only allows for recognition of a lane line having a color lighter than that of a road surface, and does not allow for recognition of a lane line having a color darker than that of a road surface, for example, a black line. Therefore, for example, if a light-color lane line such as a white line is faded, reliability of lane-line recognition lowers. As a result, a steering control may be cancelled. In a case where only a lane line having a color darker than that of the road surface is provided, it may be difficult to perform lane-line recognition in the first place.

It is desirable to provide a lane-line recognizing apparatus for vehicle that is able to favorably perform lane-line recognition.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In FIG. 1, the reference numeral 1 denotes a vehicle, i.e., an own vehicle. The vehicle 1 may be, for example but not limited to, an automobile. The vehicle 1 may be provided with a drive-assist apparatus 2. The drive-assist apparatus 2 may include, for example but not limited to, a stereo camera 3, a stereo image recognizing device 4, and a control unit 5.

The vehicle 1 may be further provided with, for example but not limited to, a vehicle-speed sensor 11, a yaw-rate sensor 12, a main switch 13, a steering-angle sensor 14, and an accelerator-position sensor 15. The vehicle-speed sensor 11 may detect an own-vehicle speed. The yaw-rate sensor 12 may detect a yaw rate. The main switch 13 may perform, for example but not limited to, ON-OFF switching of each operation performed by a drive-assist control. The steering-angle sensor 14 may be provided to oppose a steering shaft coupled to a steering wheel, and may detect a steering angle. The accelerator-position sensor 15 may detect an amount by which an accelerator pedal is pressed by a driver, i.e., an accelerator position.

The stereo camera 3 may include a pair of cameras each using, for example, a solid-state imaging device such as a charge-coupled device (CCD) or a complementary metal oxide semiconductor (CMOS) as a stereo optical system. These cameras may be disposed on the left and on the right with a certain distance therebetween at a front portion of a ceiling in a vehicle interior. The cameras may perform stereo imaging of a target outside the vehicle from different viewpoints, and supply image data to the stereo image recognizing device 4.

In the following, one of the images captured by stereo imaging, for example, a right image, is referred to as a "reference image", and the other, for example, a left image, is referred to as a "comparative image".

The stereo image recognizing device 4 may first divide the reference image into small regions of 4×4 pixels, for example. The stereo image recognizing device 4 may compare the reference image with the comparative image on the basis of brightness or a color pattern of each of the small regions, and find a region, in the comparative image, corresponding to each of the small regions in the reference image. The stereo image recognizing device 4 may thereby calculate a distance distribution over the entire reference image.

Further, the stereo image recognizing device 4 may check a brightness difference between each of the pixels and a pixel adjacent thereto on the reference image. The stereo image recognizing device 4 may extract a pixel having a brightness difference greater than a threshold value as an edge. The stereo image recognizing device 4 may provide the extracted pixel, i.e., the edge, with distance information. The stereo image recognizing device 4 may thereby generate a distribution image of edges having distance information, i.e., a distance image.

Figure 2:
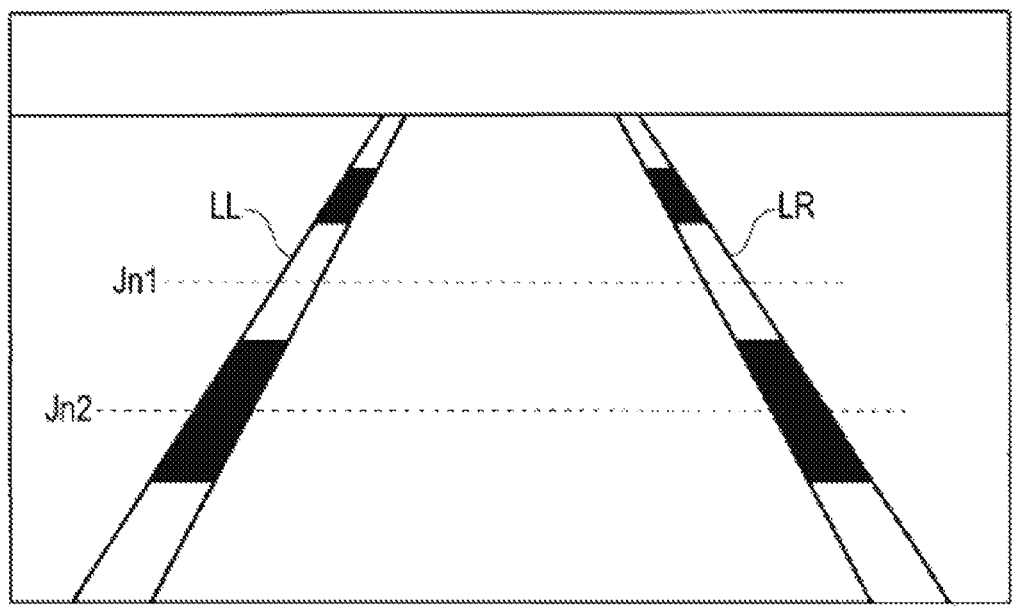
FIG. 2 is an explanatory diagram schematically illustrating an example of an image capturing a vehicle external environment.

Further, the stereo image recognizing device 4 may recognize, for example, lane lines LL and LR in front of the own vehicle 1 (see FIG. 2), a road edge, a sidewall, a three-dimensional object, and any other object on the basis of the generated distance image. The stereo image recognizing device 4 may assign different IDs to the respective pieces of recognized data, and monitor the pieces of recognized data on the ID basis continuously between frames.

As used in the description of the example embodiment, the terms "lane line LL" and "lane line LR" (see FIG. 2) each collectively refer to lines that each extend on a road and section the traveling lane on which the own vehicle is traveling. Accordingly, the "lane line LL" and "lane line LR" may each include, for example but not limited to, a single line or multiple lines such as double lines having a delineator line provided inside a lane line. Each of the lines included in the lane lines LL and LR is not limited to a particular form, and may be a solid line, a broken line, or any other form of line. Further, each of the lines included in the lane lines LL and LR may be a line of any color, for example, a line having a color lighter than that of the road surface such as a white line or a yellow line, or a line having a color darker than that of the road surface such as a black line.

In recognizing the lane lines LL and LR in the example embodiment, even if the actual lane line on the road includes two or more lines, the lines on the left may be approximated to a single straight line or a single curved line and recognized as a single line, and the lines on the right may be approximated to a single straight line or a single curved line and recognized as a single line.

Figure 3:
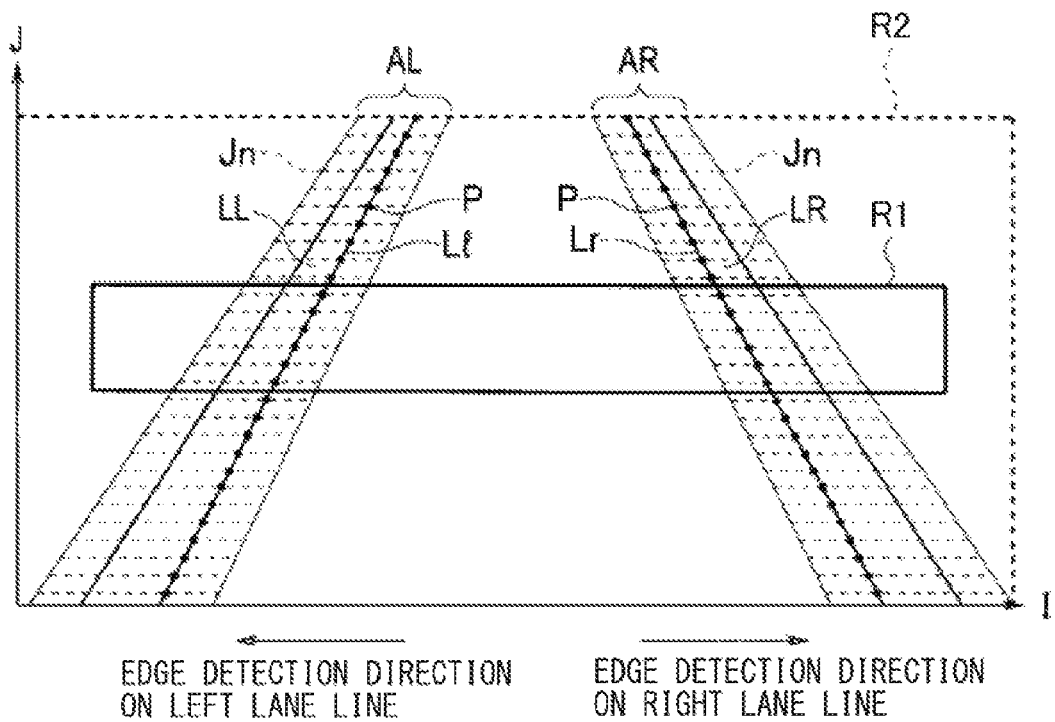
FIG. 3 is an explanatory diagram illustrating an example of segments set for respective modes and an example of a point group including lane-line start points detected from the image.

Upon such recognition of the lane lines LL and LR, the stereo image recognizing device 4 may detect a single lane-line start point P for each of search lines Jn on the basis of brightness variation on the search lines Jn (see FIG. 3). The search lines Jn may be set in a horizontal direction, i.e., a vehicle-width direction, in a left lane-line search region AL and a right lane-line search region AR. The left lane-line search region AL and the right lane-line search region AR may be set on the image on the basis of processes up to the previous process. Hereinafter, the left lane-line search region AL and the right lane-line search region AR are sometimes simply referred to as the "lane-line search region AL" and the "lane-line search region AR".

That is, for example, the stereo image recognizing device 4 may check the variation in respective brightness values of the pixels on each of the search lines Jn from the inner side to the outer side in the vehicle-width direction in each of the left lane-line search region AL and the right lane-line search region AR set on the reference image. The stereo image recognizing device 4 may thereby detect each of the lane-line start points P as an edge point of the lane line.

For recognition of the lane lines LL and LR by the stereo image recognizing device 4, two segments, i.e., a first segment R1 and a second segment R2, may be set on the reference image. The first segment R1 and the second segment R2 may be predetermined regions different from each other and may be used for respective edge search modes. The stereo image recognizing device 4 may alternately detect an opposite edge candidate point PO and a standard edge candidate point PS in a predetermined J-th row of the search lines Jn in the two segments, i.e., the first segment R1 and the second segment R2.

For a later-described standard edge search mode of the two edge search modes, for example, the first segment R1 of the two segments may be set. The first segment R1 may have a range from 4 segments to 5 segments (about 16 m to about 20 m), for example.

For a later-described opposite edge search mode of the two edge search modes, for example, the second segment R2 of the two segments may be set. The second segment R2 may have a range greater than that of the first segment R1, which may be from 2 segments to 12 segments (about 8 m to about 48 m), for example. The second segment R2 here may be the entire region on the reference image for detecting the edge candidate points of the lane lines LL and LR.

Further, the stereo image recognizing device 4 may calculate an approximate line of each point group including the lane-line start points P recognized in each of the left lane-line search region AL and the right lane-line search region AR. Further, the stereo image recognizing device 4 may newly set, on the basis of the calculated lane lines LL and LR, the lane-line search regions AL and AR to be used for recognizing the lane lines LL and LR in the next frame.

The left lane-line search region AL and the right lane-line search region AR may be set in a range from 2 segments to 12 segments (about 8 m to about 48 m) in a front region of the image data of the stereo image captured by the stereo camera 3. That is, detection of edge candidate points of the lane lines LL and LR may be executed within the left lane-line search region AL and the right lane-line search region AR in the range from about 8 m to about 48 m in the front region of the vehicle 1.

According to the example embodiment, the stereo image recognizing device 4 may thus serve as a lane-line recognizing apparatus for vehicle (the own vehicle 1), and allows each of edge-point detection (search) operation, approximate-line calculation operation, lane-line search operation, lane-line calculation operation, and detection-region setting operation to be achieved.

The control unit 5 may receive traveling environment information of the front region of the vehicle 1 recognized by the stereo image recognizing device 4. The control unit 5 may further receive information of the vehicle speed from the vehicle-speed sensor 11, information of the yaw rate from the yaw-rate sensor 12, and any other suitable information as the traveling information of the vehicle 1. The control unit 5 may also receive an operation signal from the main switch 13, information of a steering angle from the steering-angle sensor 14, information of the accelerator position from the accelerator-position sensor 15, and any other suitable information as information of an operation input performed by the driver.

For example, the control unit 5 may be instructed to execute adaptive cruise control (ACC) operation, which is one kind of operation of the drive-assist control, through the operation performed on the main switch 13 by the driver. In this case, the control unit 5 may read information of a direction of a preceding vehicle recognized by the stereo image recognizing device 4, and determine whether the preceding vehicle to follow is traveling on the road on which the own vehicle 1 is traveling.

In a case where no preceding vehicle to follow is detected accordingly, the control unit 5 may execute a constant-speed traveling control through an opening and closing control of a throttle valve 16, i.e., an engine output control. The constant-speed traveling control may allow for maintaining the vehicle speed of the vehicle 1 at a set vehicle speed. The set vehicle speed may be set by the driver.

In contrast, in a case where the preceding vehicle to follow is detected and where the vehicle speed of the preceding vehicle is the set vehicle speed or lower, the control unit 5 may execute a following traveling control that allows the own vehicle 1 to follow the preceding vehicle while keeping a distance between the own vehicle 1 and the preceding vehicle to be a target vehicle-to-vehicle distance.

Upon executing the following traveling control, the control unit 5 may keep the distance between the own vehicle 1 and the preceding vehicle to be the target vehicle-to-vehicle distance basically through the opening and closing control of the throttle valve 16, i.e., the engine output control. In a case where the control unit 5 determines that sufficient deceleration cannot be achieved only by controlling the throttle valve 16 because of a reason such as sudden deceleration of the preceding vehicle, the control unit 5 may also perform a control of output hydraulic pressure from an active booster 17, i.e., a brake automatic intervention control, together with the opening and closing control of the throttle valve 16. The control unit 5 may thereby keep the distance between the own vehicle 1 and the preceding vehicle to be the target vehicle-to-vehicle distance.

The control unit 5 may be instructed to execute lane departure prevention operation, which is one kind of operation of the drive-assist control, through the operation performed on the main switch 13 by the driver. In this case, for example, the control unit 5 may set a warning determination line on the basis of the left and right lane lines defining the own-vehicle traveling lane, and estimate an own-vehicle traveling route on the basis of the vehicle speed and the yaw rate of the vehicle 1.

For example, in a case where the control unit 5 determines that the own-vehicle traveling route crosses the warning determination line on the left or the right in a set distance in front of the own vehicle 1, the control unit 5 may determine that it is highly possible that the vehicle 1 departs from the current own-vehicle traveling lane, and perform lane-line deviation warning. The set distance in front of the own vehicle 1 may be, for example, 10 m to 16 m.

The control unit 5 may be instructed to execute active lane keep centering (ALKC) operation, which is one kind of operation of the drive-assist control, through the operation performed on the main switch 13 by the driver. In this case, for example, the control unit 5 may set the own-vehicle target traveling route in the middle of the left lane line LL and the right lane line LR defining the own-vehicle traveling lane. Further, the control unit 5 may perform a traveling control that allows the vehicle 1 to travel along the set own-vehicle target traveling route.

In the following, a description is given of contents which the stereo image recognizing device 4 may execute upon detecting and recognizing the lane lines LL and LR.

First, the stereo image recognizing device 4 may read the left lane-line search region AL and the right lane-line search region AR set in the previous frame. In a case of performing edge detection, for example, on the search line Jn1 (see FIG. 2) on the lane lines LL and LR having a color lighter than that of the road surface, the stereo image recognizing device 4 may perform detection of the lane-line start point P in each of the left lane-line search region AL and the right lane-line search region AR from an inner side toward an outer side in the vehicle-width direction using an image center line on the reference image or the own-vehicle traveling direction estimated from a factor such as a steering angle as a reference, for example. Examples of the color lighter than that of the road surface may include white and yellow.

Figure 4:
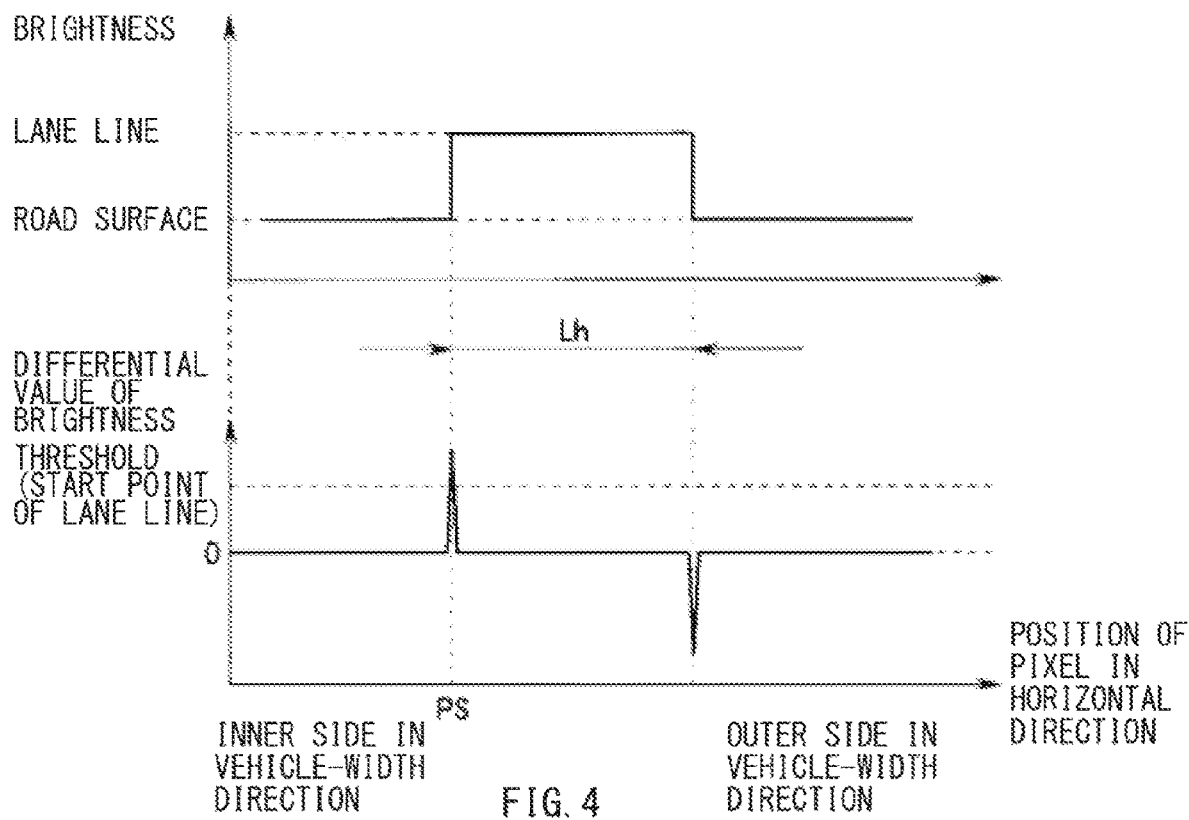
FIG. 4 is a diagram illustrating an example of respective transitions of brightness and a differential value of the brightness at a lane-line start point and a lane-line end point on a search line in an odd-numbered row.
Figure 5:
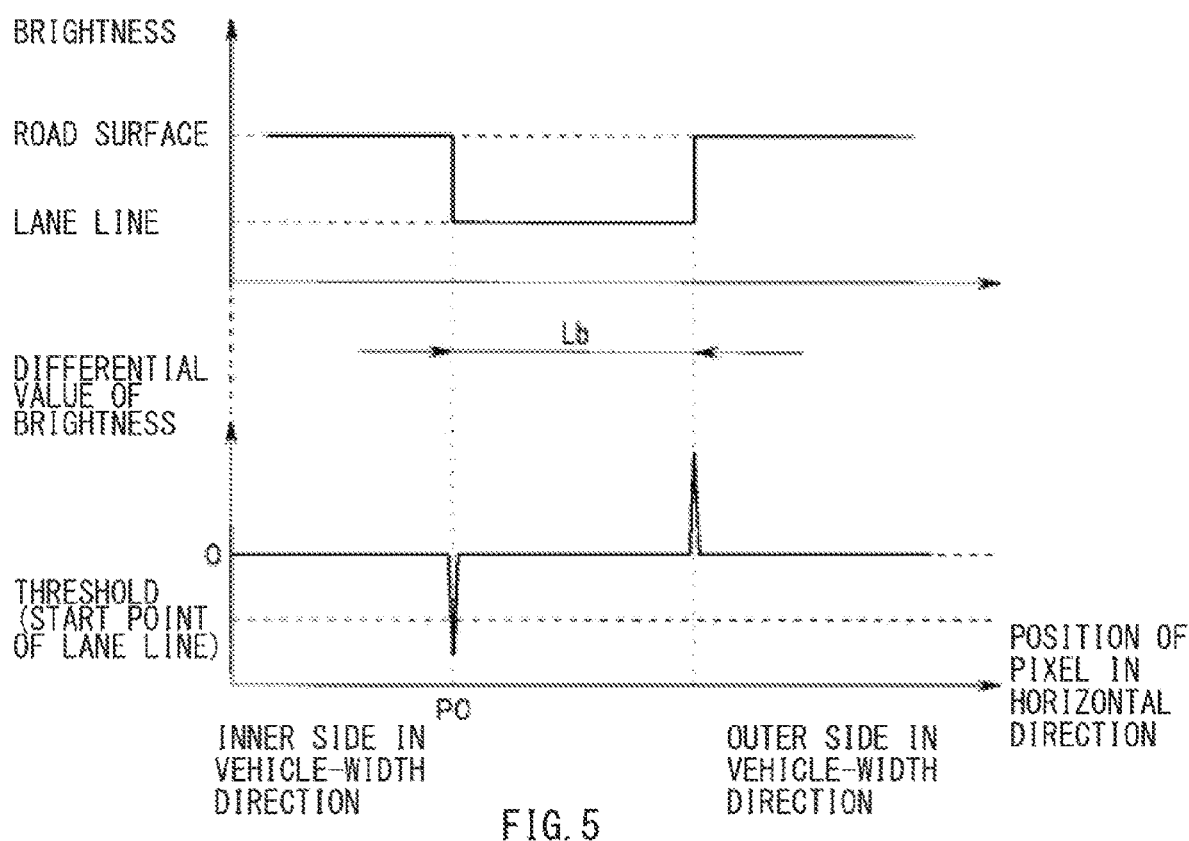
FIG. 5 is a diagram illustrating an example of respective transitions of brightness and a differential value of the brightness at a lane-line start point and a lane-line end point on a search line in an even-numbered row.

For example, as illustrated in FIG. 4, upon performing searching on the search line Jn1 from the inner side toward the outer side in the vehicle-width direction, the stereo image recognizing device 4 may detect, as the standard edge candidate point PS which is a positive edge point, a first point where the brightness of the pixel on the outer side in the vehicle-width direction is relatively high with respect to the brightness of the pixel on the inner side and where a differential value of the brightness, which represents a variation amount of the brightness, is greater than or equal to a preset positive threshold, i.e., a brightness threshold. Further, the stereo image recognizing device 4 may recognize the detected standard edge candidate point PS as a lane-line start point P.

By performing the above-described process, the stereo image recognizing device 4 may recognize the lane lines LL and LR having the color lighter than that of the road surface, such as white or yellow. That is, the stereo image recognizing device 4 may exclude a point where the differential value of the brightness is not greater than or equal to the preset positive threshold from the target of the detection of the standard edge candidate point PS of the lane lines LL and LR, and therefore refrain from recognizing such a point as the lane-line start point P.

In a case where a separation distance Lh from the standard edge candidate point PS of the edge start point where the differential value of the brightness becomes positive to an edge end point where the differential value of the brightness becomes negative is less than or equal to a predetermined distance, i.e., a line-width threshold, the stereo image recognizing device 4 may refrain from recognizing the lane lines LL and LR. The predetermined distance, i.e., the line-width threshold may be, for example, 7 cm.

In a case of performing edge detection, for example, on the search line Jn2 (see FIG. 2) on the lane lines LL and LR having a color darker than that of the road surface, the stereo image recognizing device 4 may perform the searching from the inner side toward the outer side in the vehicle-width direction. Examples of the color darker than that of the road surface may include black. Upon such searching, the stereo image recognizing device 4 may detect, as the opposite edge candidate point PO which is a negative edge point, a first point where the brightness of the pixel on the outer side in the vehicle-width direction is relatively low with respect to the brightness of the pixel on the inner side and where a differential value of the brightness, which represents a variation amount of the brightness, is less than or equal to a preset negative threshold, i.e., a brightness threshold. Further, the stereo image recognizing device 4 may recognize the detected opposite edge candidate point PO as the lane-line start point P.

By performing the above-described process, the stereo image recognizing device 4 may recognize the lane lines LL and LR having the color darker than that of the road surface, such as black. That is, the stereo image recognizing device 4 may exclude a point where the differential value of the brightness is not less than or equal to the preset negative threshold from the target of the detection of the opposite edge candidate point PO of the lane lines LL and LR, and therefore refrain from recognizing such a point as the lane-line start point P.

In a case where a separation distance Lb from the opposite edge candidate point PO of the edge start point where the differential value of the brightness becomes negative to an edge end point where the differential value of the brightness becomes positive is less than or equal to a predetermined distance, i.e., a line-width threshold, the stereo image recognizing device 4 may refrain from recognizing the lane lines LL and LR. The predetermined distance, i.e., the line-width threshold may be, for example, 7 cm.

The stereo image recognizing device 4 may integrate the point group including the plurality of lane-line start points P of the standard edge candidate point PS and the opposite edge candidate point PO. The stereo image recognizing device 4 may perform lane-line calculation on the basis of the selected point group. By performing the lane-line calculation, the stereo image recognizing device 4 may recognize the approximate lines derived from Hough transform performed on the selected point group as approximate lines Ll and Lr representing the lane lines LL and LR, respectively.

The stereo image recognizing device 4 may set the lane-line search regions AL and AR to be used in the next frame on the basis of the calculated lane lines LL and LR, i.e., the approximate lines Ll and Lr. Further, the stereo image recognizing device 4 may detect the lane lines LL and LR in the next frame in a similar manner.

The stereo image recognizing device 4 may thus alternately perform detection of the lane lines LL and LR having the lighter color such as white or yellow and detection of the lane lines LL and LR having the darker color such as black. The stereo image recognizing device 4 may perform the detection of the lane lines LL and LR having the lighter color and the detection of the lane lines LL and LR having the darker color in different modes using the search lines Jn in the first segment R1 or the second segment R2 in accordance with the modes.

Figure 6:
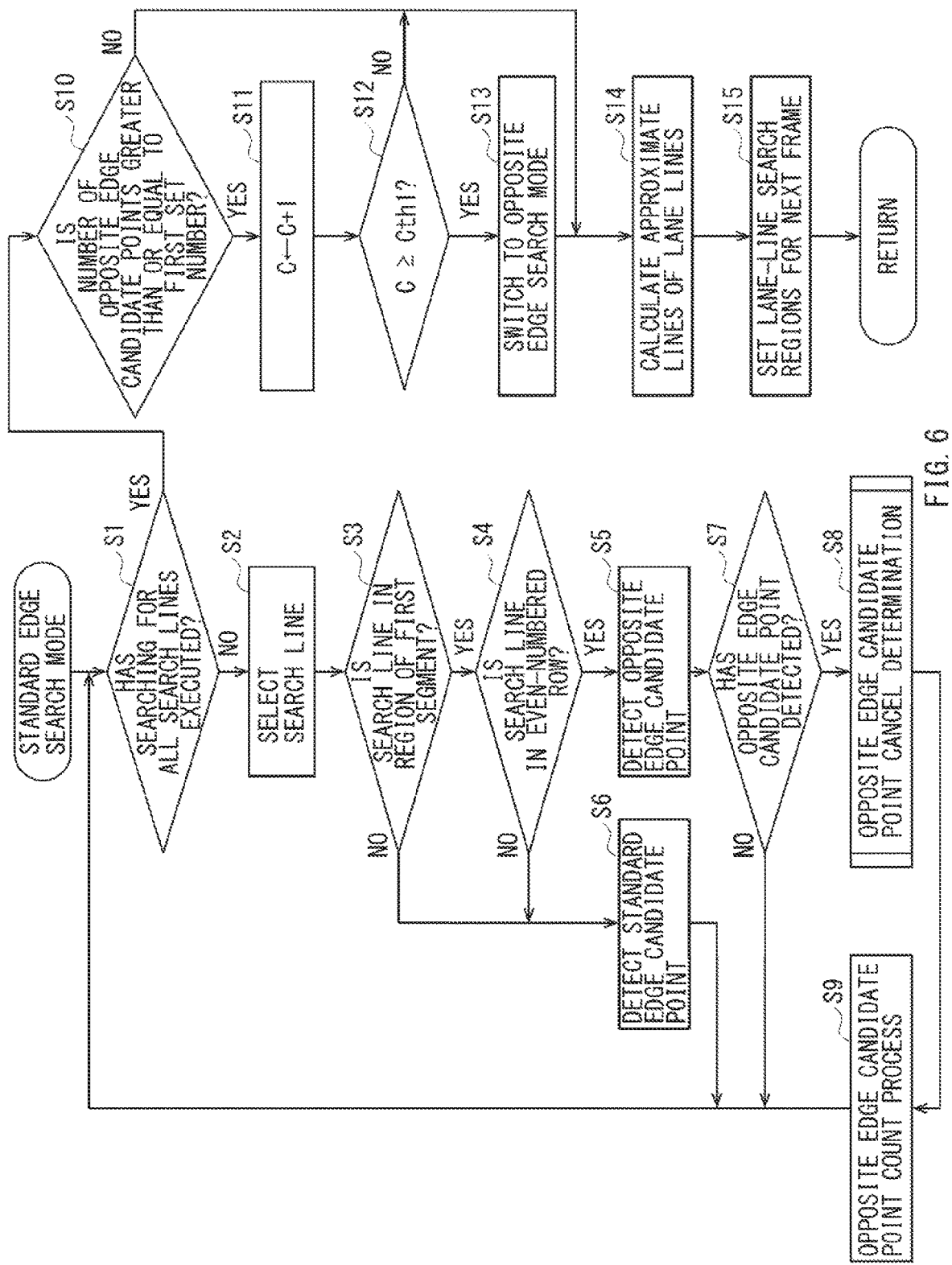
FIG. 6 is a flow chart illustrating an example of a lane-line recognition routine in a standard edge search mode.

In the following, a description is given of a control routine in the standard edge search mode for the recognition of the lane lines LL and LR performed by the stereo image recognizing device 4 with reference to a flow chart illustrated in FIG. 6. This routine may be executed repeatedly every time a new image is captured while the standard edge search mode is selected.

In the standard edge search mode, the stereo image recognizing device 4 may first determine whether searching for all of the search lines Jn has been executed (step S1). In a case where the searching for all of the search lines Jn has not been executed yet (NO in step S1), the stereo image recognizing device 4 may select a search line Jn (step S2).

Figure 7:
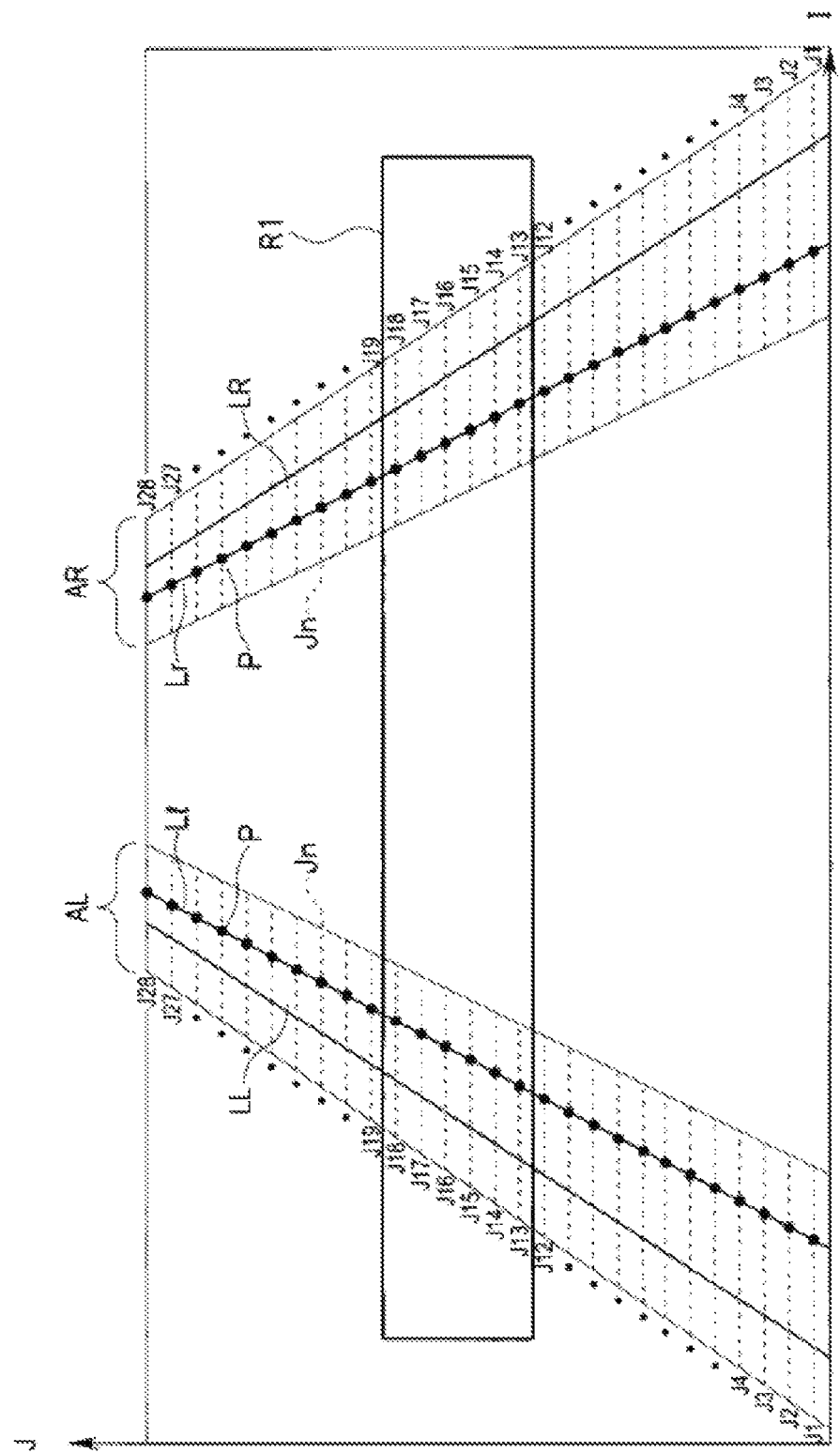
FIG. 7 is an explanatory diagram illustrating an example of a first segment set for the standard edge search mode and an example of a point group including lane-line start points detected from the image.

At the start of the standard edge search mode, the stereo image recognizing device 4 may select a search line J1 in the first row near the vehicle 1 (see FIG. 7). In step S2 of a routine after searching the edge candidate point on the search line Jn in the J-th row, the stereo image recognizing device 4 may select the next search line Jn+1 sequentially from the near side toward the farther side.

That is, in selecting the search line Jn, for example, pairs of search lines Jn, i.e., the search lines extending in the horizontal direction, present in the lane-line search regions AL and AR may be selected sequentially from the lower side of the image. Therefore, the stereo image recognizing device 4 may select the search line Jn+1 that is immediately above the search line Jn which has been subjected to the previous candidate-point detection.

Thereafter, the stereo image recognizing device 4 may determine whether the currently-selected search line Jn is present in the region of the first segment R1 set on the image (step S3). In a case where the search line Jn present in the region of the first segment R1 is selected (YES in step S3), the stereo image recognizing device 4 may determine whether the search line Jn is in the even-numbered row (step S4). In a case where the search line Jn present in the region of the first segment R1 is not selected (NO in step S3), the stereo image recognizing device 4 may detect the standard edge candidate point PS (step S6). Thereafter, the process may be caused to exit the routine and return to step S1.

In a case where the search line Jn in the region of the first segment R1 is in the even-numbered row (YES in step S4), for example, in a case where the search line Jn is any of search lines J14, J16, and J18 illustrated in FIG. 7, the stereo image recognizing device 4 may detect the opposite edge candidate point PO (step S5). Note that the number of the search lines Jn in the even-numbered rows described above in the first segment R1 is a mere example.

In such detection of the opposite edge candidate point PO, the opposite edge candidate point PO where the negative differential value of the brightness is less than or equal to the threshold may be recognized as the lane-line start point P of the lane line LL or LR having a color darker than that of the road surface, such as black.

In a case where the search line Jn in the region of the first segment R1 is not in the even-numbered row and is in the odd-numbered row (NO in step S4), for example, in a case where the search line Jn is any of search lines J13, J15, and J17 illustrated in FIG. 7, the stereo image recognizing device 4 may detect the standard edge candidate point PS (step S6). Thereafter, the process may be caused to exit the routine and return to step S1. Note that the number of the search lines Jn in the odd-numbered rows described above in the first segment R1 is a mere example.

In such detection of the standard edge candidate point PS, the standard edge candidate point PS where the positive differential value of the brightness is greater than or equal to the threshold may be recognized as the lane-line start point P of the lane line LL or LR having a color lighter than that of the road surface, such as white or yellow.

After the process in step S5, the stereo image recognizing device 4 may determine whether the opposite edge candidate point PO has been detected (step S7). In a case where the opposite edge candidate point PO has been detected (YES in step S7), the stereo image recognizing device 4 may execute opposite edge candidate point PO cancel determination which is a sub-routine to be described later (step S8). In a case where the opposite edge candidate point PO has not been detected (NO in step S7), the stereo image recognizing device 4 may cause the process to exit the routine and return to step S1.

In a case where the stereo image recognizing device 4 recognizes the opposite edge candidate point PO in step S8, the stereo image recognizing device 4 may count the opposite edge candidate point PO in step S9. In a case where the opposite edge candidate point PO is canceled in step S8, the stereo image recognizing device 4 may execute a process of refraining from counting the canceled opposite edge candidate point PO (step S9). Thereafter, the stereo image recognizing device 4 may cause the process to exit the routine and return to step S1.

After it is determined in step S1 that searching for all of the search lines Jn has been executed (YES in step S1), the stereo image recognizing device 4 may determine whether the number of the opposite edge candidate points PO counted in step S9 is a first set number or greater (step S10).

In a case where it is determined that the number of the opposite edge candidate points PO is the first set number or greater (YES in step S10), the stereo image recognizing device 4 may increment a counter C (C←C+1) (step S11). Thereafter, the stereo image recognizing device 4 may determine whether the counter C is greater than or equal to a first threshold Cth1 which is a preset counter threshold (step S12).

In a case where it is determined that the counter C is greater than or equal to the first threshold Cth1 (YES in step S12), the stereo image recognizing device 4 may switch the recognition mode for the lane lines LL and LR to the opposite edge search mode (step S13). Thereafter, the stereo image recognizing device 4 may calculate approximate lines Ll and Lr on the basis of the detected lane-line start points P (step S14). Thereafter, the stereo image recognizing device 4 may set the lane-line search regions AL and AR for the next frame on the basis of the calculated approximate lines Ll and Lr (step S15). Thereafter, the stereo image recognizing device 4 may cause the process to exit the routine and return to step S1.

In a case where it is determined that the counter C is less than the first threshold Cth1 (NO in step S12), the stereo image recognizing device 4 may calculate the approximate lines Ll and Lr in step S14, set the lane-line search regions AL and AR in step S15, and cause the process to exit the routine and return to step S1.

Figure 8:
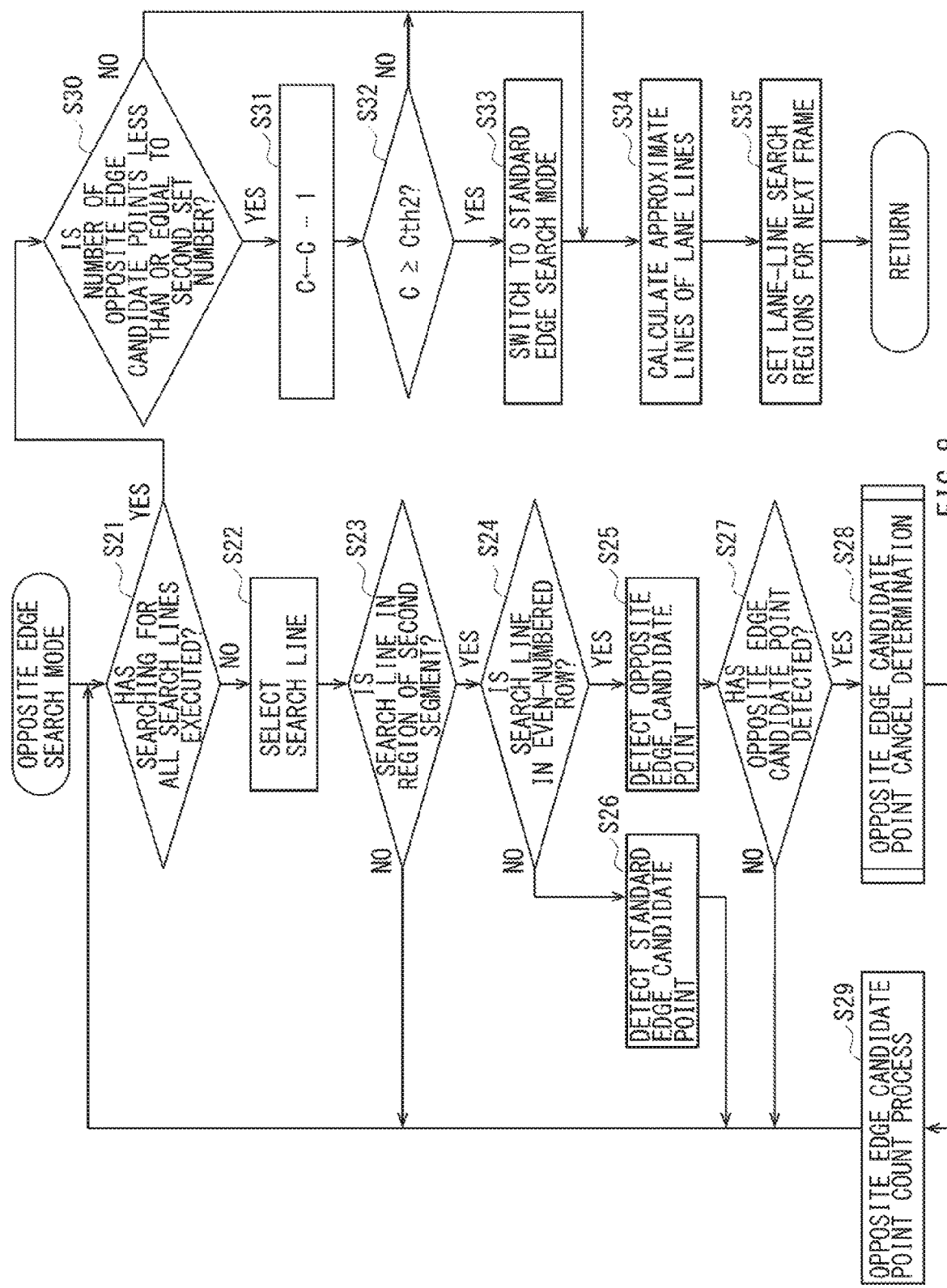
FIG. 8 is a flow chart illustrating an example of a lane-line recognition routine in an opposite edge search mode.

In the following, a description is given of a control routine in the opposite edge search mode for the recognition of the lane lines LL and LR performed by the stereo image recognizing device 4 with reference to a flow chart illustrated in FIG. 8. This routine may be executed repeatedly every time a new image is captured while the opposite edge search mode is selected.

In the opposite edge search mode, the stereo image recognizing device 4 may determine whether searching for all of the search lines Jn has been executed (step S21), as in the standard edge search mode. In a case where the searching for all of the search lines Jn has not been executed yet (NO in step S21), the stereo image recognizing device 4 may select a search line Jn (step S22).

Figure 9:
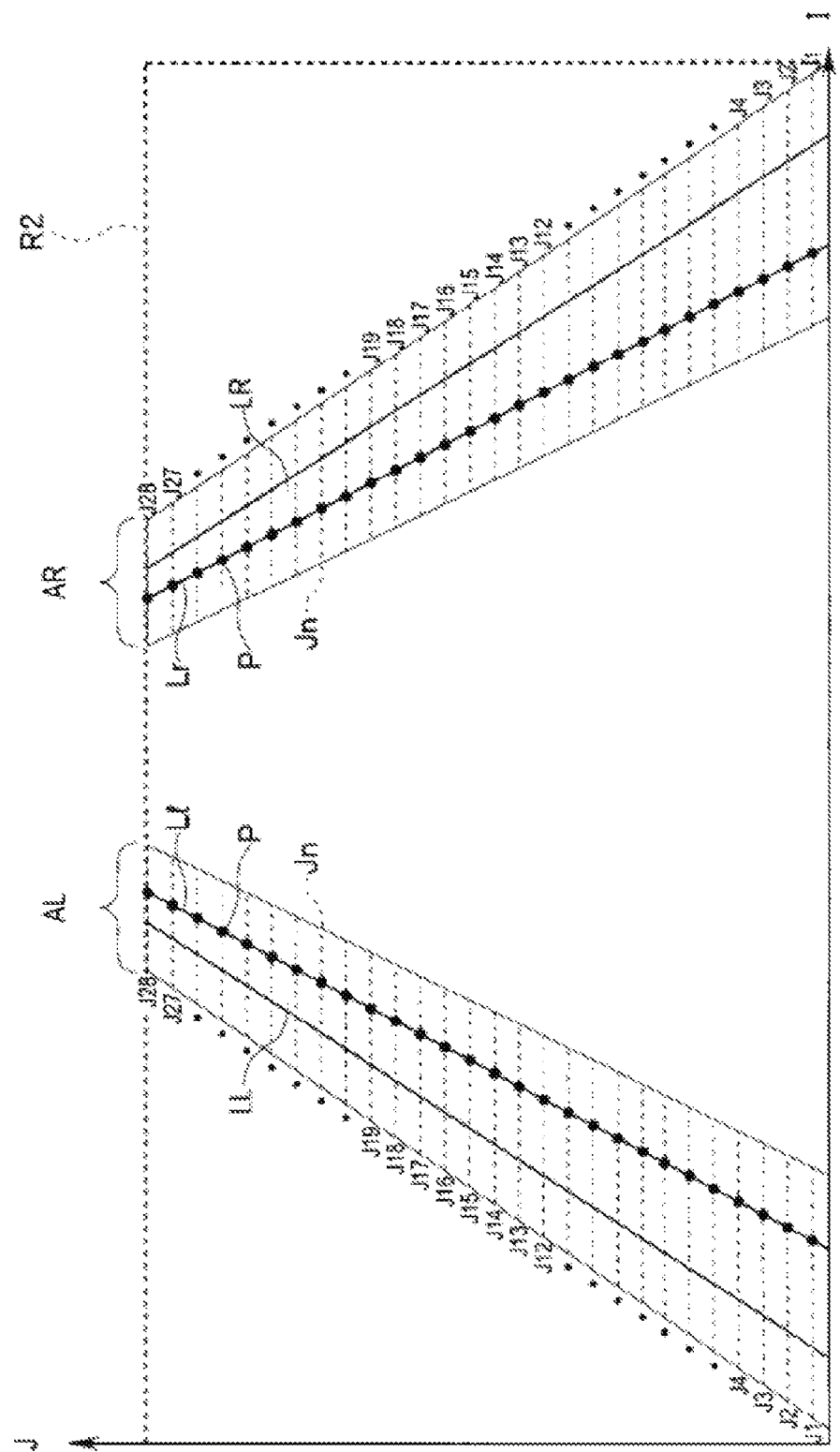
FIG. 9 is an explanatory diagram illustrating an example of a second segment set for the opposite edge search mode and an example of a point group including lane-line start points detected from the image.

At the start of the opposite edge search mode, the stereo image recognizing device 4 may select a search line J1 in the first row near the vehicle 1 (see FIG. 9). In step S22 of a routine after searching the edge candidate point on the search line Jn in the J-th row, the stereo image recognizing device 4 may select the search line Jn+1 immediately above the search line Jn which has been subjected to the previous candidate-point detection.

Thereafter, the stereo image recognizing device 4 may determine whether the currently-selected search line Jn is present in the region of the second segment R2 set on the image (step S23). In a case where the search line Jn present in the region of the second segment R2 is selected (YES in step S23), the stereo image recognizing device 4 may determine whether the search line Jn is in the even-numbered row (step S24). In a case where the search line Jn present in the region of the second segment R2 is not selected (NO in step S23), the stereo image recognizing device 4 may cause the process to exit the routine and return to step S21.

In a case where the search line Jn in the region of the second segment R2 is in the even-numbered row (YES in step S24), for example, in a case where the search line Jn is any of search lines J2, J4, . . . J14, J16, J18, . . . J28 illustrated in FIG. 9, the stereo image recognizing device 4 may detect the opposite edge candidate point PO (step S25). Note that the number of the search lines Jn in the odd-numbered rows in the second segment R2 is a mere example.

In such detection of the opposite edge candidate point PO, the opposite edge candidate point PO where the negative differential value of the brightness is less than or equal to the threshold may be recognized as the lane-line start point P of the lane line LL or LR having a color darker than that of the road surface, such as black.

In a case where the search line Jn in the region of the second segment R2 is not in the even-numbered row and is in the odd-numbered row (NO in step S24), for example, in a case where the search line Jn is any of search lines J1, J3, . . . J13, J15, J17, . . . J27 illustrated in FIG. 9, the stereo image recognizing device 4 may detect the standard edge candidate point PS (step S26). Thereafter, the process may be caused to exit the routine and return to step S21. Note that the number of the search lines Jn in the odd-numbered rows in the second segment R2 is a mere example.

In such detection of the standard edge candidate point PS, the standard edge candidate point PS where the positive differential value of the brightness is greater than or equal to the threshold may be recognized as the lane-line start point P of the lane line LL or LR having a color lighter than that of the road surface, such as white or yellow.

After the process in step S25, the stereo image recognizing device 4 may determine whether the opposite edge candidate point PO has been detected (step S27). In a case where the opposite edge candidate point PO has been detected (YES in step S27), the stereo image recognizing device 4 may execute opposite edge candidate point PO cancel determination which is a sub-routine to be described later (step S28). In a case where the opposite edge candidate point PO has not been detected (NO in step S27), the stereo image recognizing device 4 may cause the process to exit the routine and return to step S21.

In a case where the stereo image recognizing device 4 recognizes the opposite edge candidate point PO in step S28, the stereo image recognizing device 4 may count the opposite edge candidate point PO in step 29. In a case where the opposite edge candidate point PO is canceled in step 28, the stereo image recognizing device 4 may execute a process of refraining from counting the canceled opposite edge candidate point PO (step S29). Thereafter, the stereo image recognizing device 4 may cause the process to exit the routine and return to step S21.

After it is determined in step S21 that searching for all of the search lines Jn has been executed (YES in step S21), the stereo image recognizing device 4 may determine whether the number of the opposite edge candidate points PO counted in step S29 is a second set number or less (step S30).

In a case where it is determined that the number of the opposite edge candidate points PO is the second set number or less (YES in step S30), the stereo image recognizing device 4 may decrement the counter C (C←C−1) (step S31). Thereafter, the stereo image recognizing device 4 may determine whether the counter C is less than or equal to a second threshold Cth2 which is a preset counter threshold (step S32).

In a case where it is determined that the counter C is less than or equal to the second threshold Cth2 (YES in step S32), the stereo image recognizing device 4 may switch the recognition mode for the lane lines LL and LR to the standard edge search mode (step S33). Thereafter, the stereo image recognizing device 4 may calculate the approximate lines Ll and Lr on the basis of the detected lane-line start points P (step S34). Thereafter, the stereo image recognizing device 4 may set the lane-line search regions AL and AR for the next frame on the basis of the calculated approximate lines Ll and Lr (step S35). Thereafter, the stereo image recognizing device 4 may cause the process to exit the routine and return to step S21.

In a case where it is determined that the counter C is greater than the second threshold Cth2 (NO in step S32), the stereo image recognizing device 4 may calculate the approximate lines Ll and Lr in step S34, set the lane-line search regions AL and AR in step S35, and cause the process to exit the routine and return to step S21.

In the following, a description is given of a control example for the opposite edge candidate point cancel determination which is a sub-routine to be executed by the stereo image recognizing device 4 in step S8 in the standard edge search mode or in step S28 in the opposite edge search mode, with reference to a flow chart illustrated in FIG. 10. This sub-routine may be executed only in a case where the search line Jn is in the even-numbered row, and may not be executed upon searching of the standard edge candidate point PS in the odd-numbered row, as described above.

In the opposite edge candidate point cancel determination, the stereo image recognizing device 4 may first determine whether the negative differential value of the brightness of the detected opposite edge candidate point PO is less than or equal to the predetermined value (step S41).

In a case where the negative differential value of the brightness of the detected opposite edge candidate point PO is less than or equal to the predetermined value, i.e., the brightness threshold (YES in step S41), the stereo image recognizing device 4 may cause the process to proceed to step S48. In step S48, the stereo image recognizing device 4 may cancel the recognition of the opposite edge candidate point PO. Accordingly, the stereo image recognizing device 4 may refrain from executing the counting of the opposite edge candidate point PO in the process in step S9 in the standard edge search mode and in the process in step S29 in the opposite edge search mode.

Figure 11:
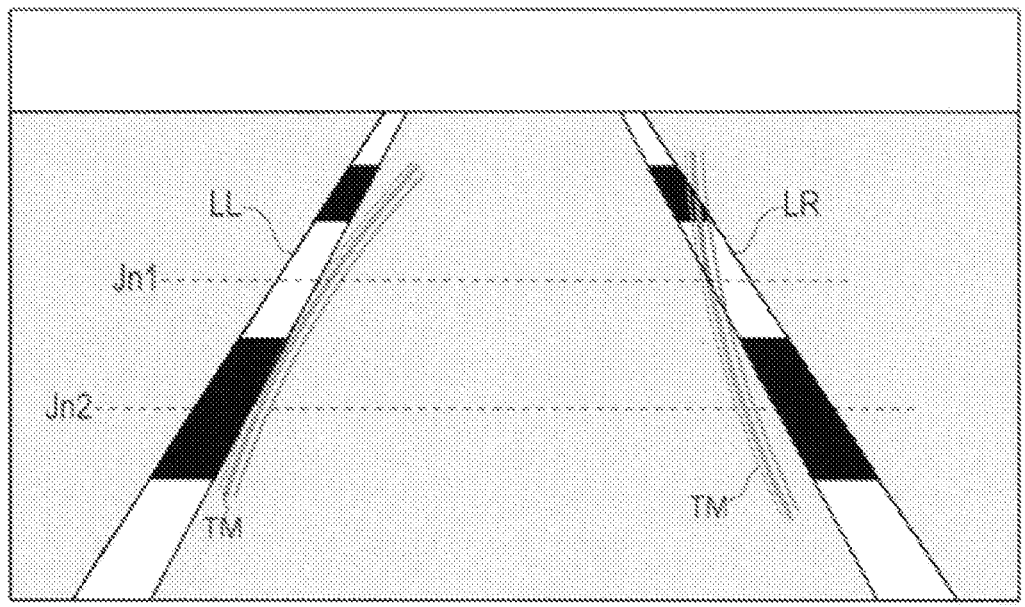
FIG. 11 is an explanatory diagram schematically illustrating an example of an image capturing a vehicle external environment including tire marks near the lane lines.
Figure 12:
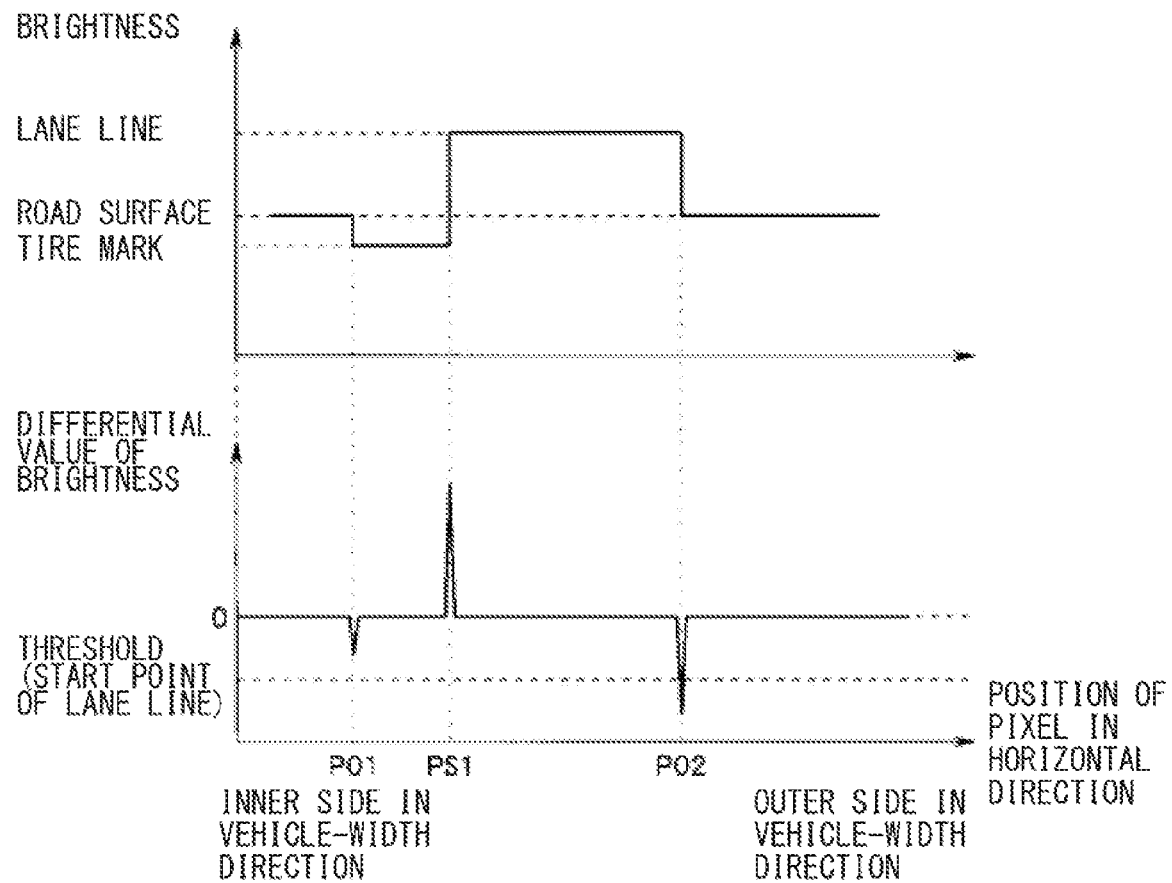
FIG. 12 is a diagram illustrating an example of respective transitions of brightness and a differential value of the brightness of the lane line on a search line in an odd-numbered row illustrated in FIG. 11.

An example situation in which the stereo image recognizing device 4 refrains from executing the counting of the opposite edge candidate point PO may be a situation illustrated in FIG. 11. In the example situation illustrated in FIG. 11, tire marks TM are present near the lane lines LL and LR and these tire marks TM are detected in the lane-line search regions AL and AR. Note that the above-described tire marks TM are mere examples, and the above may be similarly applicable to any detected object having a color darker than that of the road surface such as a stain or dirt on the road surface.

For example, in a case where the search line Jn1 on any of the lane lines LL and LR having a color lighter than that of the road surface such as white or yellow is in the even-numbered row, the stereo image recognizing device 4 may detect a start point PO1 of the opposite edge point of the tire mark TM. Because the differential value of the brightness of the start point PO1 is a positive value of the predetermined value or less, the stereo image recognizing device 4 may cancel the recognition of the start point PO1 as the opposite edge candidate point PO (step S48). This may exclude all of the detected objects having a color darker than that of the road surface and not being the lane line LL or LR, such as the tire mark TM, from the target of the recognition of the opposite edge candidate point PO.

In a case where the negative differential value of the brightness of the detected start point PO1 of the opposite edge point is not less than or equal to the predetermined value, i.e., the brightness threshold (NO in step S41), the stereo image recognizing device 4 may determine whether a difference between average brightness of the opposite edge candidate points PO and the brightness value immediately after the end point of the opposite edge point is small (step S42).

In a case where the difference between the average brightness of the opposite edge candidate points PO and the brightness value immediately after the end point of the opposite edge point is small (YES in step S42), the stereo image recognizing device 4 may cause the process to proceed to step S48, in which the stereo image recognizing device 4 may cancel the recognition of the start point PO1 of the opposite edge point as the opposite edge candidate point PO.

Figure 13:
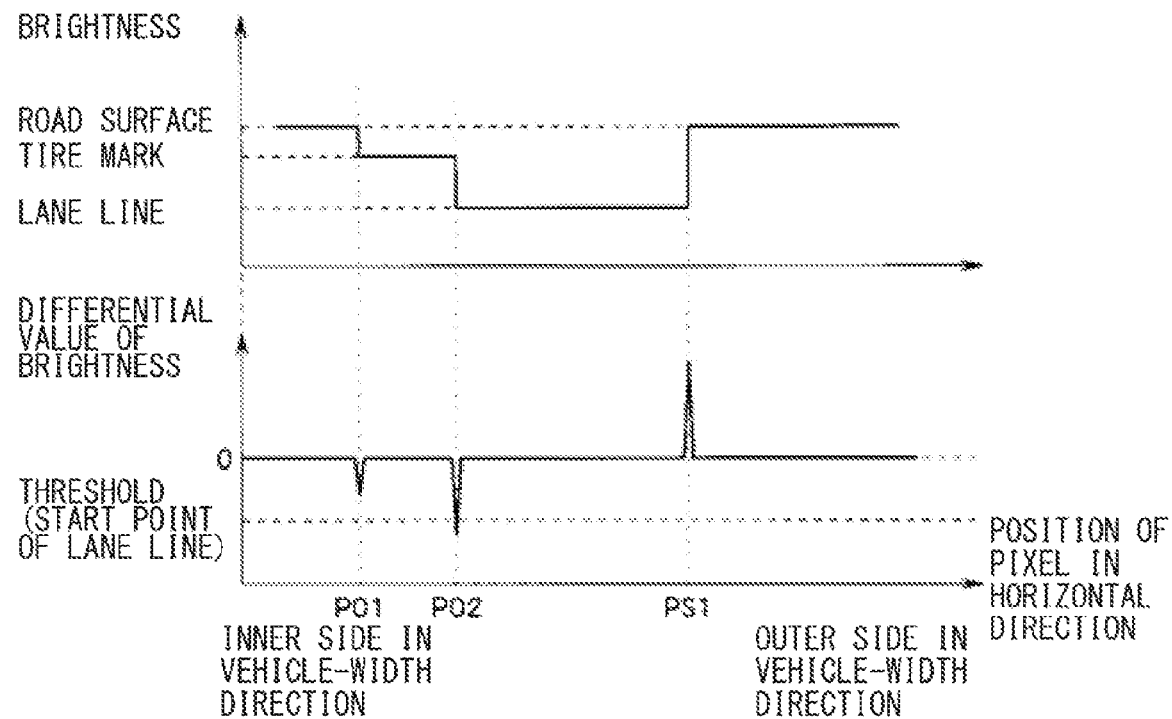
FIG. 13 is a diagram illustrating an example of respective transitions of brightness and a differential value of the brightness of the lane line on a search line in an even-numbered row illustrated in FIG. 11.

An example situation in which the stereo image recognizing device 4 refrains from recognizing the opposite edge candidate point PO may be a situation: where the search line Jn2 on the lane lines LL and LR having a color darker than that of the road surface such as black is in the even-numbered row as illustrated in FIG. 11; and where the tire mark TM and a plurality of opposite edge points, for example, two opposite edge points PO1 and PO2, are detected on the lane line LL as illustrated in FIG. 13.

Because the differential value of the brightness at the start point PO1 of the opposite edge point of the tire mark TM is a positive value greater than the predetermined value also in this case, the stereo image recognizing device 4 may cause the process to proceed to step S48, in which the stereo image recognizing device 4 may cancel the recognition of the start point PO1 of the opposite edge point as the opposite edge candidate point PO.

Figure 14:
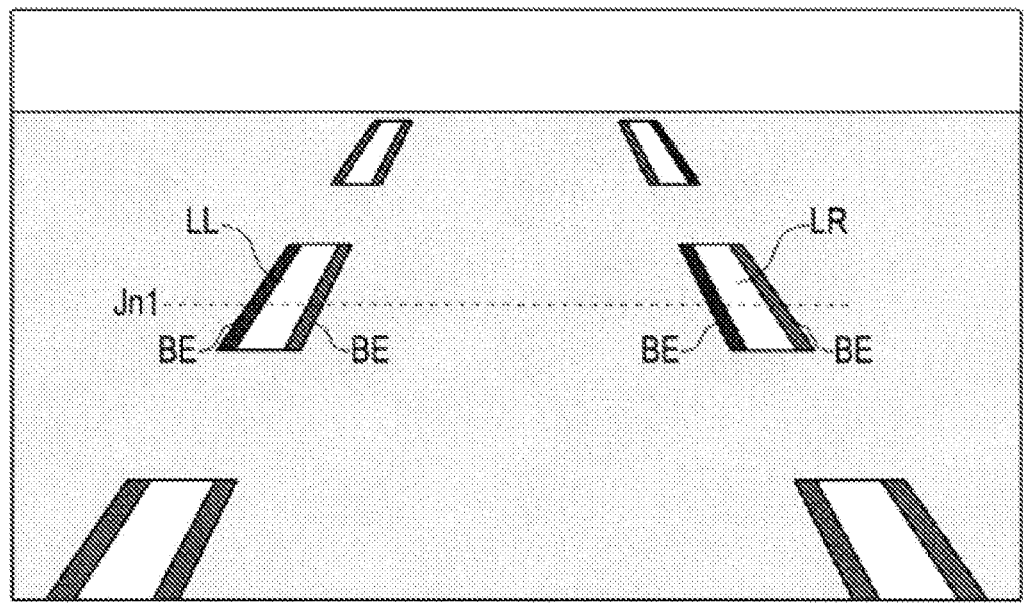
FIG. 14 is an explanatory diagram schematically illustrating an example of an image capturing a vehicle external environment in which lane lines having a color lighter than that of a road surface each have a dark-color line such as a black edge line at its edge.
Figure 15:
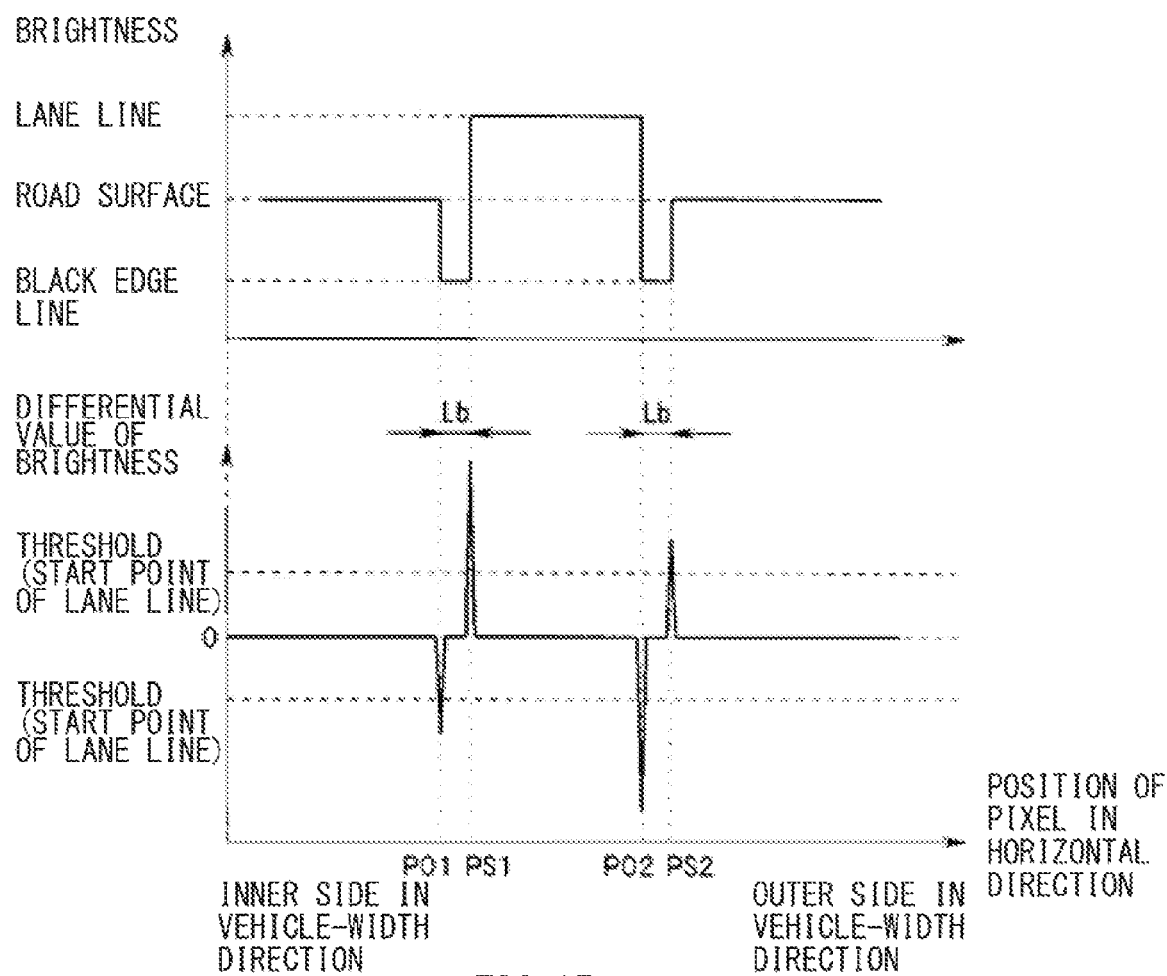
FIG. 15 is a diagram illustrating an example of respective transitions of brightness and a differential value of the brightness of each of the lane lines illustrated in FIG. 14.

In a case where the difference between the average brightness of the opposite edge candidate points PO and the brightness value immediately after the positive edge point serving as the end point is not small, i.e., is large (NO in step S42), the stereo image recognizing device 4 may determine whether a difference between the brightness immediately before the start point PO1 of the opposite edge point, i.e., road-surface brightness, and the brightness immediately after the end point PS1 of the opposite edge point is large (step S43). For example, as illustrated in FIG. 14, the lane lines LL and LR may each include a white line and black edge lines BE, which are the dark-color lines, provided on both sides of the white line. In such a case, the difference between the brightness value of the start point PO1 of the opposite edge point and the brightness value of the end point PS1 of the opposite edge point may be large because the brightness of the road surface and the brightness of the lane line LL or LR are different from each other.

Therefore, in a case where the difference between the brightness value of the start point PO1 of the opposite edge point and the brightness value of the end point PS1 of the opposite edge point is large (YES in step S43), the stereo image recognizing device 4 may cause the process to proceed to step S48, in which the stereo image recognizing device 4 may cancel the recognition of the start point PO1 of the opposite edge point as the opposite edge candidate point PO.

In a case where the difference between the brightness value of the start point PO1 of the opposite edge point and the brightness value of the end point PS1 of the opposite edge point is not large, i.e., is small (NO in step S43), the stereo image recognizing device 4 may determine whether a separation distance from the start point PO1 of the opposite edge point to the end point PS1 of the opposite edge point is less than or equal to a predetermined value, i.e., a line width Lb (step S44). The predetermined value may be, for example, 7 cm.

Figure 10:
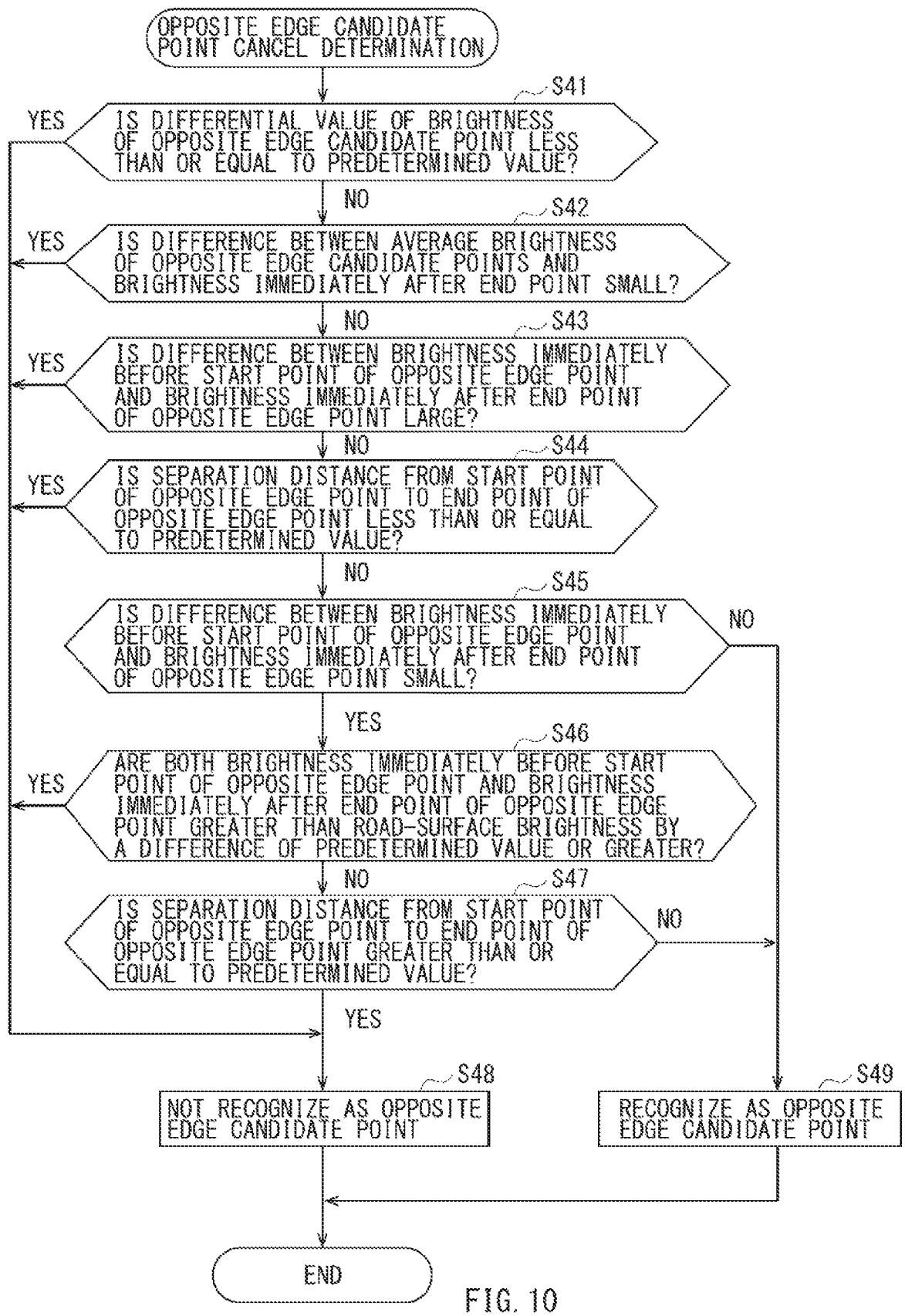
FIG. 10 is a flow chart illustrating an example of opposite edge candidate point cancel determination.

In a case where it is determined that the separation distance from the start point PO1 of the opposite edge point to the end point PS1 of the opposite edge point is less than or equal to the predetermined value set in advance in step S44 illustrated in FIG. 10 (YES in step S44), the stereo image recognizing device 4 may cause the process to proceed to step S48, in which the stereo image recognizing device 4 may cancel the recognition of the start point PO1 of the opposite edge point as the opposite edge candidate point PO. This may exclude, for example, the black edge line BE having a small line width Lb which is not the lane line LL or LR from the recognition as the lane lines LL and LR.

That is, the stereo image recognizing device 4 may recognize the lane lines LL and LR with the black edge lines BE on both sides in a case where it is determined that the difference between the brightness immediately before the start point PO1 of the opposite edge point and the brightness immediately after the end point PS1 of the opposite edge point is large in step S43 illustrated in FIG. 10 (YES in step S43), or in a case where it is determined that the separation distance from the start point PO1 of the opposite edge point to the end point PS1 of the opposite edge point, i.e., the line width, is less than the predetermined value in step S44 (YES in step S44).

In contrast, in a case where it is determined that the separation distance from the start point PO1 of the opposite edge point to the end point PS1 of the opposite edge point is greater than the predetermined value in step S44 illustrated in FIG. 10 (NO in step S44), the stereo image recognizing device 4 may determine whether a difference between the brightness immediately before the start point PO1 of the opposite edge point and the brightness immediately after the end point PS2 of the opposite edge point is small in a predetermined degree (step S45).

In a case where the difference between the brightness immediately before the start point PO1 of the opposite edge point and the brightness immediately after the end point PS2 of the opposite edge point is not small in a predetermined degree, i.e., is large (NO in step S45), the stereo image recognizing device 4 may cause the process to proceed to step S49, in which the stereo image recognizing device 4 may recognize the start point PO1 of the opposite edge point as the opposite edge candidate point PO.

In a case where it is determined that the difference between the brightness immediately before the start point PO1 of the opposite edge point and the brightness immediately after the end point PS2 of the opposite edge point is small in a predetermined degree in step S45 illustrated in FIG. 10 (YES in step S45), the stereo image recognizing device 4 may determine whether both of the brightness immediately before the start point PO1 of the opposite edge point and the brightness immediately after the end point PS2 of the opposite edge point are greater than the road-surface brightness by a brightness difference of a predetermined value, i.e., a brightness-difference threshold, or greater (step S46).

In a case where it is determined that both of the brightness immediately before the start point PO1 of the opposite edge point and the brightness immediately after the end point PS2 of the opposite edge point are greater than the road-surface brightness by the brightness difference of the predetermined value or greater in step S46 illustrated in FIG. 10 (YES in step S46), the stereo image recognizing device 4 may cause the process to proceed to step S48, in which the stereo image recognizing device 4 may cancel the recognition of the start point PO1 of the opposite edge point as the opposite edge candidate point PO.

In a case where it is determined that one or both of the brightness immediately before the start point PO1 of the opposite edge point and the brightness immediately after the end point PS2 of the opposite edge point are not greater than the road-surface brightness by the brightness difference of the predetermined value or greater, i.e., are less than the road-surface brightness or are greater than the road-surface brightness by the brightness difference of less than the predetermined value, in step S46 illustrated in FIG. 10 (NO in step S46), the stereo image recognizing device 4 may determine whether the separation distance from the start point PO1 of the opposite edge point and the end point PS2 of the opposite edge point is a predetermined value or greater (step S47).

In a case where it is determined that the separation distance from the start point PO1 of the opposite edge point and the end point PS2 of the opposite edge point is the predetermined value or greater in step S47 illustrated in FIG. 10 (YES in step S47), the stereo image recognizing device 4 may cancel the recognition of the start point PO1 of the opposite edge point as the opposite edge candidate point PO (step S48). In contrast, in a case where it is determined that the separation distance from the start point PO1 of the opposite edge point and the end point PS2 of the opposite edge point is not the predetermined value or greater in step S47 illustrated in FIG. 10 (NO in step S47), the stereo image recognizing device 4 may cause the process to proceed to step S49, in which the stereo image recognizing device 4 may recognize the start point PO1 of the opposite edge point as the opposite edge candidate point PO.

Figure 16:
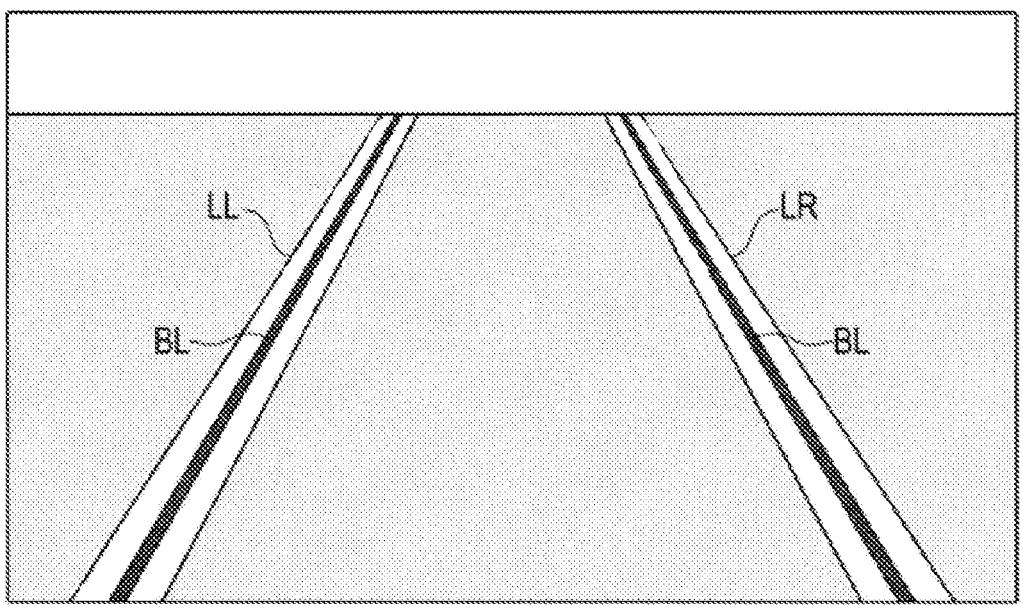
FIG. 16 is an explanatory diagram schematically illustrating an example of an image capturing a vehicle external environment in which lane lines, such as carpool lanes, having a color lighter than that of a road surface each have a dark-color line such as a black line in the middle thereof.

Note that the routine in steps S45 to S47 may be performed, for example, in a case illustrated in FIG. 16. In this case, for example, a black line BL is provided in the middle of the white line in each of the lane lines LL and LR defining the carpool lane. In such a case, the routine in steps S45 to S47 may be performed to refrain from recognizing the black line BL as the lane line LL or LR.

In such a situation, the stereo image recognizing device 4 may recognize the start point PO1 of the opposite edge point not as the opposite edge candidate point PO but as the black line BL in the middle of the carpool lane, in a case: where the difference between the brightness immediately before the start point PO1 of the opposite edge point and the brightness immediately after the end point PS2 of the opposite edge point is small; and where both the brightness immediately before the start point PO1 of the opposite edge point and the brightness immediately after the end point PS2 of the opposite edge point are greater than the road-surface brightness by a difference of the predetermined value or greater.

Figure 17:
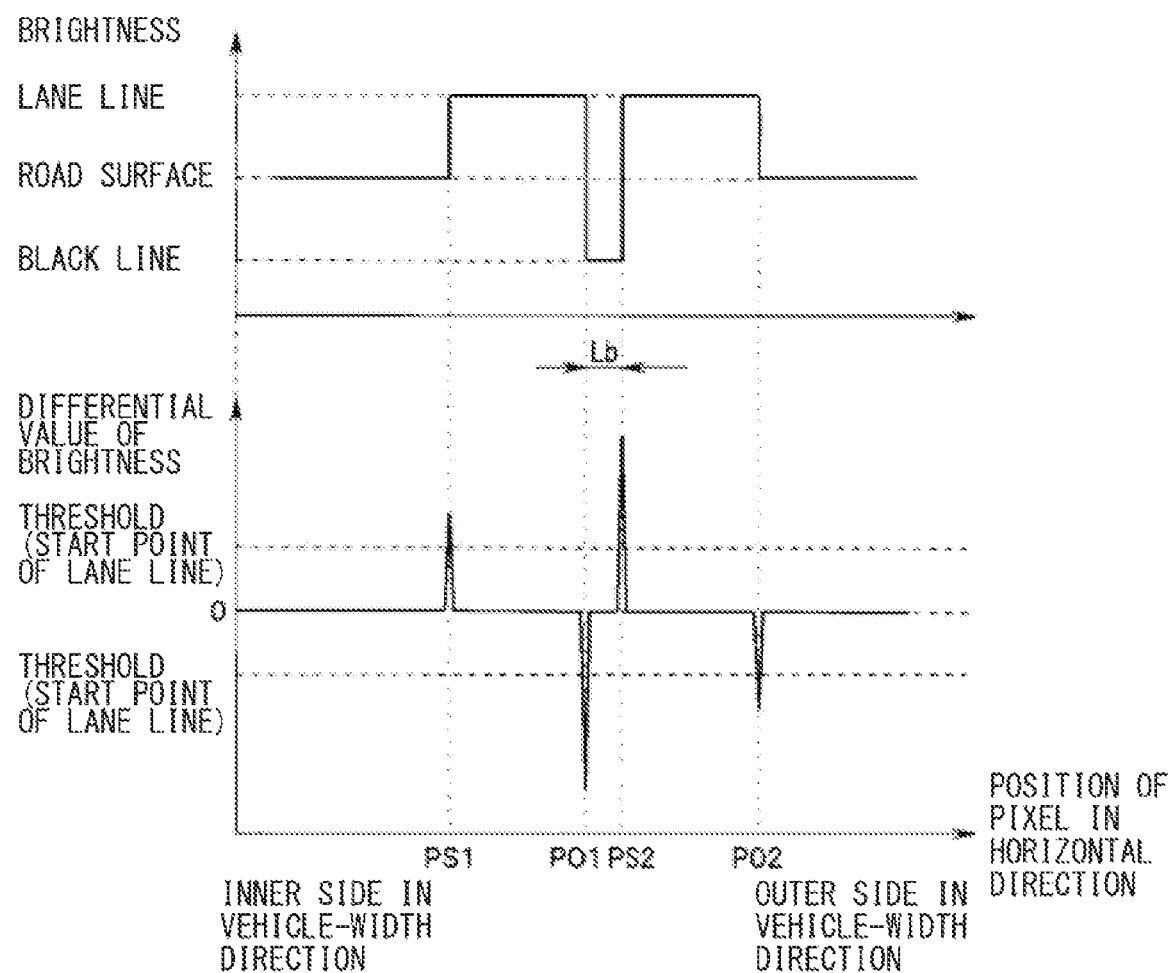
FIG. 17 is a diagram illustrating an example of respective transitions of brightness and a differential value of the brightness of each of the lane lines illustrated in FIG. 16.

Alternatively, the stereo image recognizing device 4 may recognize the start point PO1 of the opposite edge point not as the opposite edge candidate point PO but as the black line BL in the middle of the carpool lane for each of the lane lines LL and LR provided with the black line BL in the middle of the white line, in a case where: the edge point PS1 is the end point; the edge point PO2 is the end point; and a separation distance from the start point PO1 of the first opposite edge point to the end point PO2 of the opposite edge point in the middle, i.e., the line width Lb, is a predetermined value or greater, as illustrated in FIG. 17.

This helps to prevent mistakenly recognizing the black line BL in the middle of the white line, for example, as in the carpool lane, as the lane line LL or LR. Note that, in a case where the lane line LL or LR is provided with, for example, the black line BL in the middle of the white line, if the separation distance from the start point PO1 of the opposite edge point in the middle to the end point PS2 of the opposite edge point is less than the predetermined value in step S41, the stereo image recognizing device 4 may make determination of not recognizing the start point PO1 of the opposite edge point as the opposite edge candidate point PO.

As described above, the stereo image recognizing device 4 may be configured to make determination of canceling the recognition of the opposite edge candidate point PO for various special kinds of the lane lines LL and LR.

As described above, the stereo image recognizing device 4 serving as the lane-line recognizing apparatus for vehicle according to the example embodiment may be configured to recognize the lane lines LL and LR having a color darker than that of a road surface such as black in addition to the lane lines LL and LR having a color lighter than that of the road surface.

Therefore, the vehicle 1 may be able to continue the steering control without cancelling the lane departure prevention operation or the ALKC operation even in a case where the lane lines LL and LR are the dark-color lines such as black lines. The vehicle 1 may be able to continue the steering control without cancelling the lane departure prevention operation or the ALKC operation also in a case where: the lane lines LL and LR are the light-color lines such as white lines or yellow lines; and where a portion of the lane lines LL and LR where the line is faded is repaired with a dark-color line.

Accordingly, the stereo image recognizing device 4 serving as the lane-line recognizing apparatus for vehicle is able to favorably recognize the lane lines LL and LR independently of whether the lane lines LL and LR have a darker color or a lighter color with respect to the road surface.

Note that the lane lines LL and LR may include only the dark-color lines such as black lines. In addition, the example embodiment is described above with reference to an example where the start point of the lane line is used as the edge point of the lane line; however, the technology is not limited thereto. For example, instead of the start point of the lane line, the end point of the lane line where the brightness varies from bright to dark may be used.

Further, the example embodiment is described above with reference to an example where the lane line is recognized on the basis of a pair of images captured by stereo imaging; however, the technology is not limited thereto. It is needless to say that the lane line may be recognized on the basis of an image captured by any other apparatus such as a monocular camera.

The stereo image recognizing device 4 and the control unit 5 may each include a processor including, for example but not limited to, a central processing unit (CPU) and a memory device such as a read-only memory (ROM) or a random-access memory (RAM). The configuration of all or a portion of the plurality of circuits in the processor may be implemented in software. For example, the CPU may read and execute any of various programs corresponding to the respective kinds of operation stored in the ROM.

In addition, all or a portion of the operation of the processor may be achieved by a logic circuit or an analog circuit, and the process of any of the various programs may be implemented by an electronic circuit such as a field-programmable gate array (FPGA).

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein.

For example, in a case where the above-described concerns may be addressed and the above-described effects may be obtained even if some features are deleted from all the features disclosed herein, the remaining features may be extracted as a technology.

The invention claimed is:

1. A lane-line recognizing apparatus for a vehicle, the lane-line recognizing apparatus comprising circuitry configured to
    detect edge points on a basis of brightness variation in a horizontal direction within a detection region for a lane line, the detection region being set in an image obtained by imaging of a traveling environment of the vehicle; and
    calculate an approximate line of a point group including the edge points, and recognize the approximate line of the point group as an approximate line representing the lane line, wherein
    the lane-line recognizing apparatus has a first mode and a second mode,
        the first mode being a mode in which the lane-line recognizing apparatus is configured to mainly search for standard edge candidate points, each of the standard edge candidate points being one of the edge points having brightness that is relatively high with respect to brightness of a road surface on which the vehicle is traveling,
        the second mode being a mode in which the lane-line recognizing apparatus is configured to mainly search for opposite edge candidate points, each of the opposite edge candidate points being one of the edge points having brightness that is relatively low with respect to the brightness of the road surface, and
    the lane-line recognizing apparatus is configured to selectively perform switching between the first mode and the second mode in accordance with a number of the detected opposite edge candidate points, wherein
    in a case where the first mode is selected, the lane-line recognizing apparatus is configured to:
        set a first segment in a predetermined range on the image, the first segment being a segment in which the lane-line recognizing apparatus is configured to alternately search for the standard edge candidate points in first search lines in odd-numbered rows and the opposite edge candidate points in second search lines in even-numbered rows;
        count the number of the detected opposite edge candidate points; and
        perform switching from the first mode to the second mode in a case where a counter value of the number of the opposite edge candidate points is a first threshold or greater, and
    in a case where the second mode is selected, the lane-line recognizing apparatus is configured to:
        set a second segment in a range greater than the first segment in the image, the second segment being a segment in which the lane-line recognizing apparatus is configured to alternately search for the standard edge candidate points in the first search lines in the odd-numbered rows and the opposite edge candidate points in the second search lines in the even-numbered rows;
        count the number of the detected opposite edge candidate points; and
        perform switching from the second mode to the first mode in a case where the counter value of the number of the opposite edge candidate points is a second threshold or less, wherein,
    in a case where a brightness value of any of the detected opposite edge candidate points is a brightness threshold or less, the lane-line recognizing apparatus refrains from counting the any of the opposite edge candidate points.

2. A lane-line recognizing apparatus for a vehicle, the lane-line recognizing apparatus comprising circuitry configured to
    detect edge points on a basis of brightness variation in a horizontal direction within a detection region for a lane line, the detection region being set in an image obtained by imaging of a traveling environment of the vehicle; and
    calculate an approximate line of a point group including the edge points, and recognize the approximate line of the point group as an approximate line representing the lane line, wherein the lane-line recognizing apparatus has a first mode and a second mode,
- the first mode being a mode in which the lane-line recognizing apparatus is configured to mainly search for standard edge candidate points, each of the standard edge candidate points being one of the edge points having brightness that is relatively high with respect to brightness of a road surface on which the vehicle is traveling,
- the second mode being a mode in which the lane-line recognizing apparatus is configured to mainly search for opposite edge candidate points, each of the opposite edge candidate points being one of the edge points having brightness that is relatively low with respect to the brightness of the road surface, and the lane-line recognizing apparatus is configured to selectively perform switching between the first mode and the second mode in accordance with a number of the detected opposite edge candidate points, wherein in a case where the first mode is selected, the lane-line recognizing apparatus is configured to:
- set a first segment in a predetermined range on the image, the first segment being a segment in which the lane-line recognizing apparatus is configured to alternately search for the standard edge candidate points in first search lines in odd-numbered rows and the opposite edge candidate points in second search lines in even-numbered rows;
- count the number of the detected opposite edge candidate points; and
- perform switching from the first mode to the second mode in a case where a counter value of the number of the opposite edge candidate points is a first threshold or greater, and in a case where the second mode is selected, the lane-line recognizing apparatus is configured to:
- set a second segment in a range greater than the first segment in the image, the second segment being a segment in which the lane-line recognizing apparatus is configured to alternately search for the standard edge candidate points in the first search lines in the odd-numbered rows and the opposite edge candidate points in the second search lines in the even-numbered rows;
- count the number of the detected opposite edge candidate points; and
- perform switching from the second mode to the first mode in a case where the counter value of the number of the opposite edge candidate points is a second threshold or less, wherein, in a case where a distance from a start point of any of the detected opposite edge candidate points to an end point of the any of the detected opposite edge candidate points is a line-width threshold or less, the lane-line recognizing apparatus refrains from counting the any of the opposite edge candidate points.

3. A lane-line recognizing apparatus for a vehicle, the lane-line recognizing apparatus comprising circuitry configured to
- detect edge points on a basis of brightness variation in a horizontal direction within a detection region for a lane line, the detection region being set in an image obtained by imaging of a traveling environment of the vehicle; and
- calculate an approximate line of a point group including the edge points, and recognize the approximate line of the point group as an approximate line representing the lane line, wherein the lane-line recognizing apparatus has a first mode and a second mode,
- the first mode being a mode in which the lane-line recognizing apparatus is configured to mainly search for standard edge candidate points, each of the standard edge candidate points being one of the edge points having brightness that is relatively high with respect to brightness of a road surface on which the vehicle is traveling,
- the second mode being a mode in which the lane-line recognizing apparatus is configured to mainly search for opposite edge candidate points, each of the opposite edge candidate points being one of the edge points having brightness that is relatively low with respect to the brightness of the road surface, and the lane-line recognizing apparatus is configured to selectively perform switching between the first mode and the second mode in accordance with a number of the detected opposite edge candidate points, wherein in a case where the first mode is selected, the lane-line recognizing apparatus is configured to:
- set a first segment in a predetermined range on the image, the first segment being a segment in which the lane-line recognizing apparatus is configured to alternately search for the standard edge candidate points in first search lines in odd-numbered rows and the opposite edge candidate points in second search lines in even-numbered rows;
- count the number of the detected opposite edge candidate points; and
- perform switching from the first mode to the second mode in a case where a counter value of the number of the opposite edge candidate points is a first threshold or greater, and in a case where the second mode is selected, the lane-line recognizing apparatus is configured to:
- set a second segment in a range greater than the first segment in the image, the second segment being a segment in which the lane-line recognizing apparatus is configured to alternately search for the standard edge candidate points in the first search lines in the odd-numbered rows and the opposite edge candidate points in the second search lines in the even-numbered rows;
- count the number of the detected opposite edge candidate points; and
- perform switching from the second mode to the first mode in a case where the counter value of the number of the opposite edge candidate points is a second threshold or less, wherein, in a case where a standard edge point is a start point of any of the opposite edge candidate points and an opposite edge point of the any of the opposite edge candidate points is an end point and where a distance from the start point to the end point is a predetermined value or greater, the lane-line recognizing apparatus refrains from counting the any of the opposite edge candidate point.

* * * * *